United States Patent
Tanaka et al.

(10) Patent No.: US 8,797,444 B2
(45) Date of Patent: Aug. 5, 2014

(54) IMAGING DISPLAY METHOD AND IMAGING DISPLAY DEVICE

(75) Inventors: Satoshi Tanaka, Tokorozawa (JP); Hiroshi Sakai, Sagamihara (JP); Susumu Kobayashi, Sayama (JP)

(73) Assignee: Olympus Imaging Corporation (JP)

(*) Notice: Subject to any disclaimer, the term of this patent is extended or adjusted under 35 U.S.C. 154(b) by 634 days.

(21) Appl. No.: 12/666,530

(22) PCT Filed: Jun. 12, 2008

(86) PCT No.: PCT/JP2008/060768
§ 371 (c)(1), (2), (4) Date: Dec. 23, 2009

(87) PCT Pub. No.: WO2008/001685
PCT Pub. Date: Dec. 31, 2008

(65) Prior Publication Data
US 2010/0182482 A1   Jul. 22, 2010

(30) Foreign Application Priority Data
Jun. 26, 2007   (JP) .................................. 2007-168018

(51) Int. Cl.
H04N 5/222 (2006.01)
H04N 5/235 (2006.01)
G09G 3/36 (2006.01)
H04N 3/14 (2006.01)
H04N 5/349 (2011.01)

(52) U.S. Cl.
CPC ........... *H04N 3/1587* (2013.01); *G09G 3/3611* (2013.01); *H04N 5/349* (2013.01); *G09G 2340/0407* (2013.01)
USPC ...................................... 348/333.12; 348/362

(58) Field of Classification Search
None
See application file for complete search history.

(56) References Cited

U.S. PATENT DOCUMENTS

| 6,384,816 B1 * | 5/2002 | Tabata ........................... 345/204 |
| 7,003,177 B1 * | 2/2006 | Mendlovic et al. ........... 382/299 |

(Continued)

FOREIGN PATENT DOCUMENTS

| JP | 7-284002 | 10/1995 |
| JP | 11308560 | 11/1999 |

(Continued)

OTHER PUBLICATIONS

International Search Report from International Application No. PCT/JP2008/060768.

(Continued)

*Primary Examiner* — Lin Ye
*Assistant Examiner* — John H Morehead, III
(74) *Attorney, Agent, or Firm* — Volpe and Koenig, P.C.

(57) ABSTRACT

An imaging display device of the present invention comprises an imaging element 1 photoelectrically converting an optical image, a readout control unit 6 controlling a readout position of the imaging element 1, an image processing unit 2 processing image signal readout from the imaging element 1, an image display unit 4 displaying image signal output from the image processing unit 2, a pixel shift unit 5 shifting an observation pixel position displayed on the image display unit 4, a pixel shift control unit 7 controlling the pixel shift unit 5, and a system control unit 8 controlling the readout control unit 6 and the pixel shift control unit 7 so that image signal photoelectrically converted by the imaging element 1 is displayed on the image display unit 4 and shifted by the pixel shift unit 5.

According to the present invention, it is possible to reduce delay time from imaging to displaying and to raise spatial resolution and motion resolution.

2 Claims, 20 Drawing Sheets

(56) References Cited

U.S. PATENT DOCUMENTS

| | | | |
|---|---|---|---|
| 7,242,432 B2* | 7/2007 | Watanabe | 348/333.11 |
| 7,404,645 B2* | 7/2008 | Margulis | 353/31 |
| 2003/0227552 A1* | 12/2003 | Watanabe | 348/220.1 |
| 2006/0023003 A1* | 2/2006 | Yamanaka | 345/690 |
| 2006/0043263 A1* | 3/2006 | Hatano et al. | 250/208.1 |
| 2006/0221213 A1* | 10/2006 | Watanabe et al. | 348/240.3 |
| 2007/0109422 A1* | 5/2007 | Osada et al. | 348/222.1 |
| 2007/0195180 A1* | 8/2007 | Yamasaki | 348/248 |
| 2007/0296742 A1* | 12/2007 | Damera-Venkata | 345/698 |
| 2008/0030527 A1* | 2/2008 | Namie et al. | 345/698 |
| 2009/0167920 A1* | 7/2009 | Tanaka | 348/333.02 |
| 2009/0251577 A1* | 10/2009 | Watanabe | 348/294 |
| 2010/0046906 A1* | 2/2010 | Kanamori et al. | 386/36 |
| 2012/0162463 A1* | 6/2012 | Doida | 348/222.1 |
| 2012/0200750 A1* | 8/2012 | Mabuchi et al. | 348/273 |

FOREIGN PATENT DOCUMENTS

| | | |
|---|---|---|
| JP | 2000-134549 | 5/2000 |
| JP | 2000278615 | 10/2000 |
| JP | 2002-369083 | 12/2002 |
| JP | 2003-302952 | 10/2003 |
| JP | 2003-338988 | 11/2003 |
| JP | 2006-325073 | 11/2006 |

OTHER PUBLICATIONS

Office Action issued on Dec. 20, 2011 in counterpart Japanese Patent Application No. 2007-168018.

First Office Action issued on Jan. 12, 2012 in counterpart Chinese Patent Application No. 200880021952.4.

Examination Report issued on Aug. 2, 2011 in counterpart Japanese Patent Application No. 2007-168018.

Office Action issued in counterpart Chinese Patent Application No. 20880021952.4 on Dec. 19, 2012.

Office Action dated Aug. 9, 2012 from counterpart Chinese Patent Application No. 200880021952.4.

Office Action issued Jun. 20, 2013 in counterpart Chinese Patent Application No. 200880021952.4.

* cited by examiner

FIG. 5
(a)
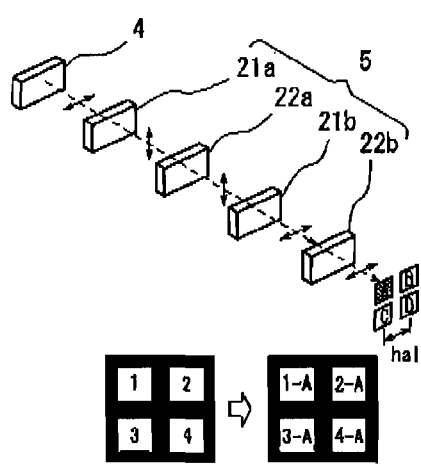
(b)
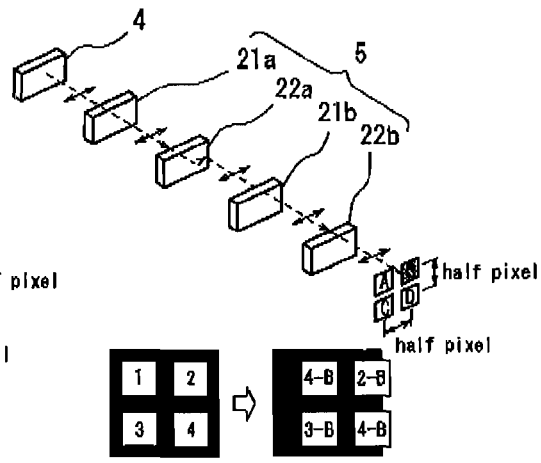
(c)
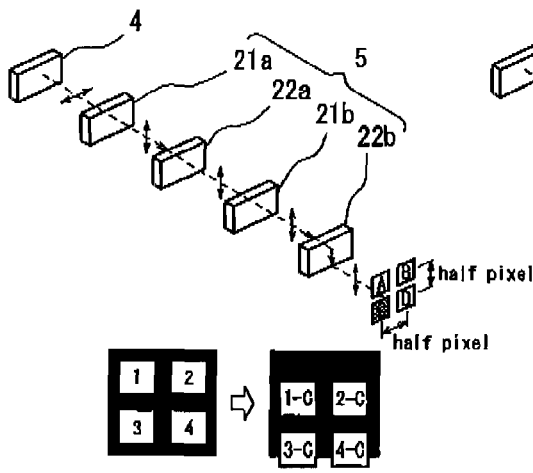
(d)
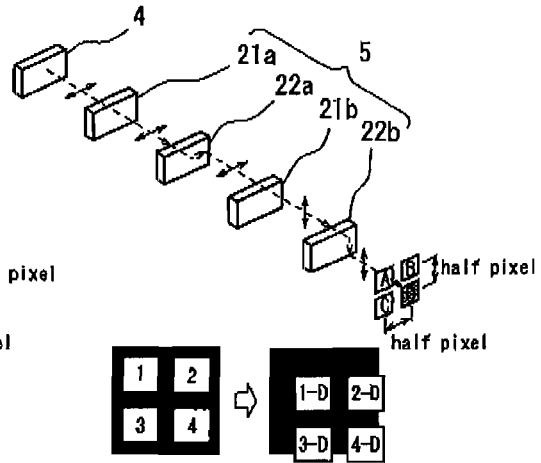

PRIOR ART

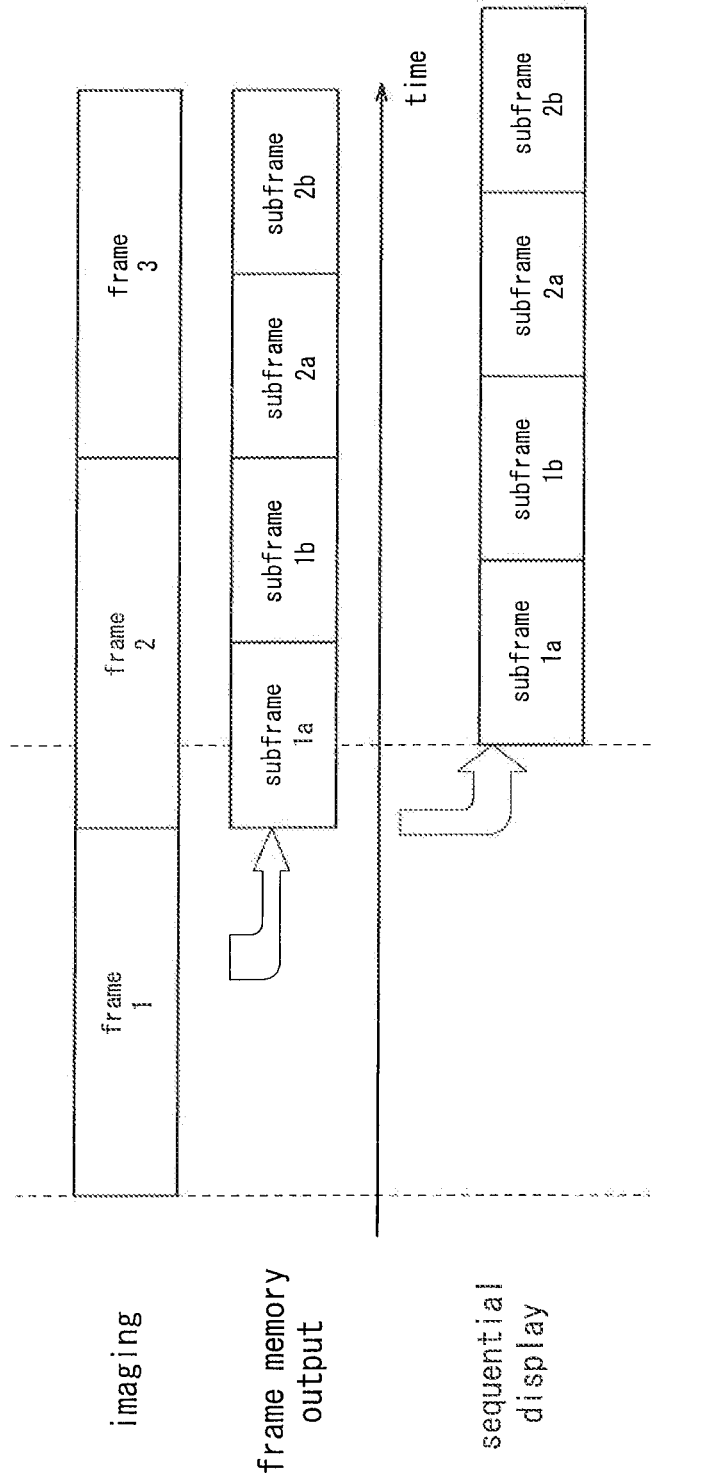

IMAGING DISPLAY METHOD AND IMAGING DISPLAY DEVICE

CROSS-REFERENCE OF RELATED APPLICATION

The present application claims the priority of Japanese Patent Application No. 2007-168018 filed on Jun. 26, 2007, which is herein incorporated in the entirety thereof for reference.

TECHNICAL FIELD

The present invention relates to an imaging display method and an imaging display device for shifting pixels of image data obtained by imaging by an imaging element and for displaying the pixel shifted image data on a display element having less pixel count than that of the imaging element in higher resolution than that of the display element.

RELATED ART

Conventionally, for example, JP2003-302952 discloses a display device for shifting pixels of input image data and for displaying the pixel shifted image data, the display device comprising an image processing circuit 110, a frame memory 111, a display 112 and a control circuit 113 as shown in FIG. 19. In this display device the image processing circuit 110 executes image processing of input image data having more pixels than the pixel count of the display 112, such as gamma correction, contrast control, brightness control and the like and then stores the processed image data in the frame memory 111 under the control of the control circuit 113. The frame data stored in the frame memory 111 is divided into image data of a plurality of subframes, sequentially readout and supplied to the display 112. The display position is sequentially changed every subframe and an image is displayed on the display 112. With this, an image at apparently higher resolution than that of the display 112 is displayed. As a result, high-resolution displaying on an inexpensive display is possible, which leads to a merit of low cost.

On the other hand, recently, for example, a MOS (Metal Oxide Semiconductor) image sensor has been widely used as an imaging element. The MOS image sensor does not need electric charge transfer in a potential well unlike a CCD (Charge Coupled Device) image sensor but can readout pixel data of an arbitrary line using a signal line (wire) so that pixel sub-sampled readout, pixel mixture readout and all pixels readout are switchable.

DISCLOSURE OF THE INVENTION

Problems to be Solved by the Invention

And now, the display device shown in FIG. 19 can be applied to an EVF (Electrical View Finder) which is a kind of a finder of a digital camera. High motion resolution and low display delay is required for the EVF since the EVF is used for the purpose of projecting an image captured by a lens as it is on a finder so that a user can confirm the captured image.

However, since a recent imaging element has high resolution, it takes time to readout high-resolution data from the imaging element and a readout frame rate becomes low. Although a method of raising a readout clock frequency is also conceived in order to raise a readout frame rate, it will cause increase of power consumption and therefore, there is a limit to raise a readout clock frequency. As a result, it is difficult to raise a readout frame rate only by raising a clock frequency. Since a frame memory for one screen corresponding to the pixel count of the imaging element is required, a circuitry becomes complex with the increase of the pixel count and display delay from imaging to displaying occurs since an image need to be written once in this frame memory.

In case that the display device shown in FIG. 19 is just applied to an EVF of a digital camera having an imaging element of the large pixel count in order to achieve cost reduction, frame data is sequentially output from the imaging element as shown in FIG. 20. At that time, delay occurs when this sequential frame data is processed in the image processing circuit 110 and then stored in the frame memory 111. In addition, further delay occurs in the process that the frame data stored in the frame memory 111 is divided into image data of plural subframes, the image data being sequentially readout, pixels of the image data being shifted and displayed on the display 112. As a result, delay more than one frame will occur from imaging in the imaging element to displaying the image on the display 112. FIG. 20 shows a case that one frame data is divided into image data of two subframes and pixels are shifted at two points.

In addition, since one high-resolution frame data having a low frame rate is divided into image data of plural subframes, pixels of the image data are shifted and then displayed, spatial resolution can be raised while temporal resolution, namely motion resolution cannot be raised since the divided image data of plural subframes is image data imaged during the same period.

It is, therefore, an object of the present invention which has been made in view of the above-mentioned problems is to provide an imaging display method and an imaging display device capable of reducing delay time from imaging to displaying as well as raising spatial resolution and motion resolution.

Means for Solving the Problem

In a first aspect of the present invention to achieve the above-mentioned object, an imaging display method comprises the steps of:

acquiring image signals of a plurality of fields, having different readout positions, from an imaging element photoelectrically converting an optical image; and displaying the image signal of the plurality of fields with pixel positions of the image signal being shifted.

In a second aspect of the present invention, the imaging display method of the first aspect, wherein pixel counts of the image signals of the fields are converted and the converted image signals are displayed on the image display unit.

In a third aspect of the present invention, the imaging display method of the first aspect, wherein the image signals of a plurality of fields, having the different readout positions, are acquired by controlling an exposure timing of the imaging element and/or an output timing of image signal from the imaging element.

In a fourth aspect of the present invention to achieve the above-mentioned object, an imaging display device comprises:

an imaging element for photoelectrically converting optical image;

a readout control unit for controlling readout positions of the imaging element;

an image processing unit for processing image signal readout from the imaging element;

an image display unit for displaying image signal output from the image processing unit;

a pixel shift unit for shifting an observation pixel position displayed on the image display unit;

a pixel shift control unit for controlling the pixel shift unit; and a system control unit for controlling the readout control unit and the pixel shift control unit so that image signal photoelectrically converted by the imaging element is displayed on the image display unit and shifted by the pixel shift unit.

In a fifth aspect of the present invention, the imaging display device of the fourth aspect further comprises an image output unit for converting a pixel count of image signal output from the image processing unit and supplying converted image data to the image display unit.

In a sixth aspect of the present invention, the imaging display device of the fifth aspect is characterized in that the image output unit converts a pixel count by sub-sampling pixels from image signal output from the image processing unit.

In a seventh aspect of the present invention, the imaging display device of the fifth aspect is characterized in that the image output unit converts a pixel count by selecting pixels from image signal output from the image processing unit.

In an eighth aspect of the present invention, the imaging display device of fourth aspect comprises a timing generator for controlling an exposure timing of the imaging element and/or an output timing of image signal from the imaging element.

In a ninth aspect of the present invention, the imaging display device of the eighth aspect is characterized in that the timing generator controls an exposure timing of the imaging element and/or an output timing of image signal from the imaging element in synchronization with control of the pixel shift unit by the pixel shift control unit.

In a tenth aspect of the present invention, the imaging display device of the eighth aspect is characterized in that the timing generator controls an exposure timing of the imaging element and/or an output timing of image signal from the imaging element so as to output image signal of the same field from the imaging element more than once.

In an eleventh aspect of the present invention to achieve the above-mentioned object, an imaging display method comprises the steps of:

acquiring image signal of a plurality of fields, having a different spatial and temporal phase, from an imaging element photoelectrically converting an optical image; and displaying the image signal of the plurality of fields with pixel positions of the image signal being shifted depending on a spatial and temporal phase.

Effect of the Invention

According to the present invention, image signals of a plurality of fields are acquired from an imaging element, the image signals having a different readout position, that is, different spatial and temporal phases, and the image signal of the plurality of fields are displayed with pixel positions of the image signal being shifted, so that it is possible to reduce delay time from imaging to displaying and to raise spatial resolution and motion resolution.

BRIEF DESCRIPTION OF THE DRAWINGS

FIG. 5 is a view showing a configuration and operation of a pixel shift unit according to a second embodiment.

FIG. 20 is a timing chart showing operation in case that the display device shown in FIG. 19 is applied to an EVF of a digital camera.

DESCRIPTION OF REFERENCE NUMERALS

Figure 1:
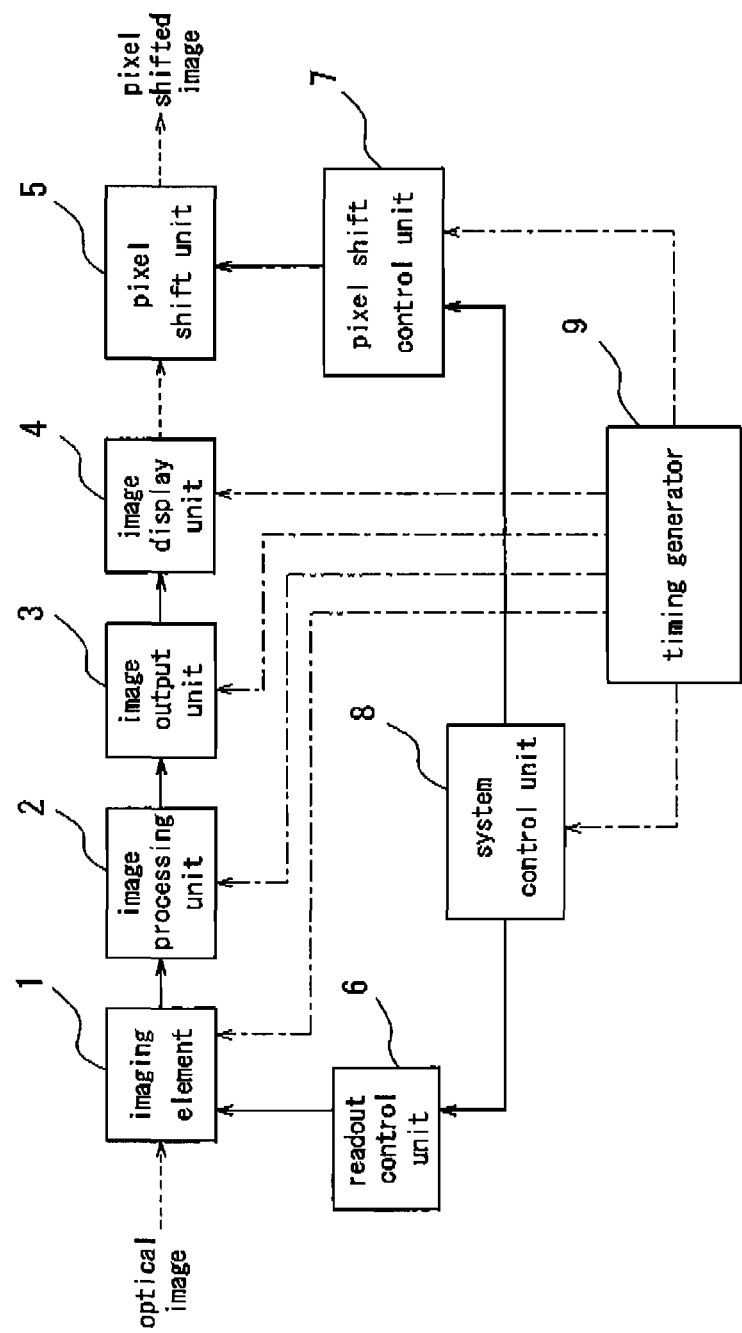
FIG. 1 is a block diagram showing a configuration of a main part of an imaging display device according to a first embodiment of the present invention.

1 imaging element
2 image processing unit
3 image output unit
4 image display unit
5 pixel shift unit
6 readout control unit
7 pixel shift control unit
8 system control unit
9 timing generator
11 liquid crystal cell
12a, 12b birefringent plate
21a, 21b liquid crystal cell
22a, 22b birefringent plate

BEST MODE FOR CARRYING OUT THE INVENTION

Hereinafter, embodiments of the present invention will be described with reference to drawings.

First Embodiment

FIG. 1 is a block diagram showing a configuration of a main part of an imaging display device according to the first embodiment of the present invention. This imaging display device has an imaging element 1, an image processing unit 2, an image output unit 3, an image display unit 4, a pixel shift unit 5, a readout control unit 6, a pixel shift control unit 7, a system control unit 8 and a timing generator 9.

The imaging element 1 has a matrix-shaped photoelectric conversion element array which photoelectrically converts an optical image incident through an optical system not illustrated into image signal and is comprised, for example, of the above-mentioned MOS image sensor. The timing generator 9 controls an exposure timing and/or an output timing of image signal of the imaging element 1 and the readout control unit 6 controls a readout position of a pixel so that this imaging element 1 readouts image signal in a predetermined readout mode and supplies thus-readout signal to the image processing unit 2.

The image processing unit 2 is arranged to convert image signal output from the imaging element 1 into digital signal, to process the signal as image data and to supply the processed image data to the image output unit 3, based on the timing signal from the timing generator 9. Image processing by the image processing unit 2 includes a process of calculating or generating image data of a certain pixel by using image data of the certain pixel and its adjacent pixels, a filtering process and the like.

The image output unit 3 is arranged to convert image data processed in the image processing unit 2 into image data having the suitable size for the pixel count of the image display unit 4 if necessary based on the timing signal from the timing generator 9 and to output thus-converted data to the image display unit 4 at the timing synchronized with pixel shift operation by the pixel shift unit 5. The image output unit 3 can omit the size converting function when the output pixel count of the imaging element 1 is equal to the pixel count of the image display unit 4 and omit the adjustment function of the output timing of image data when the imaging element 1 is readout in synchronization with pixel shift by the pixel shift unit 5.

The image display unit 4 displays an image based on image data output from the image output unit 3 based on the timing signal from the timing generator 9 and comprises, for example, an EL display element or a liquid crystal display (LCD) element spatially modulating illumination light based on image data.

The pixel shift unit 5 is arranged to optically shift a display position of a pixel of the image display unit 4 under the control of the pixel shift control unit 7. Specific configuration of this pixel shift unit 5 will be described below.

The readout control unit 6 controlling a readout position of the imaging element 1 is controlled by the system control unit 8 operating based on the timing signal from the timing generator 9. In addition, the pixel shift control unit 7 controlling the pixel shift unit 5 is controlled by the system control unit 8 based on the timing signal from the timing generator 9.

According to the first embodiment of the present invention, the pixel count of the image display unit 4 is not more than ½ of the pixel count of the imaging element 1 both in the horizontal and vertical directions in the arrangement shown in FIG. 1. The pixel shift unit 5 performs 2-point pixel shift in such a manner that, in each frame obtaining image signal of one screen from the imaging element 1, display pixel positions of the image display 4 are to be the original pixel position which is not shifted and the diagonal pixel position which is spatially shifted by a half pixel pitch both in the horizontal and vertical directions under the control of the pixel shift control unit 7.

Figure 2:
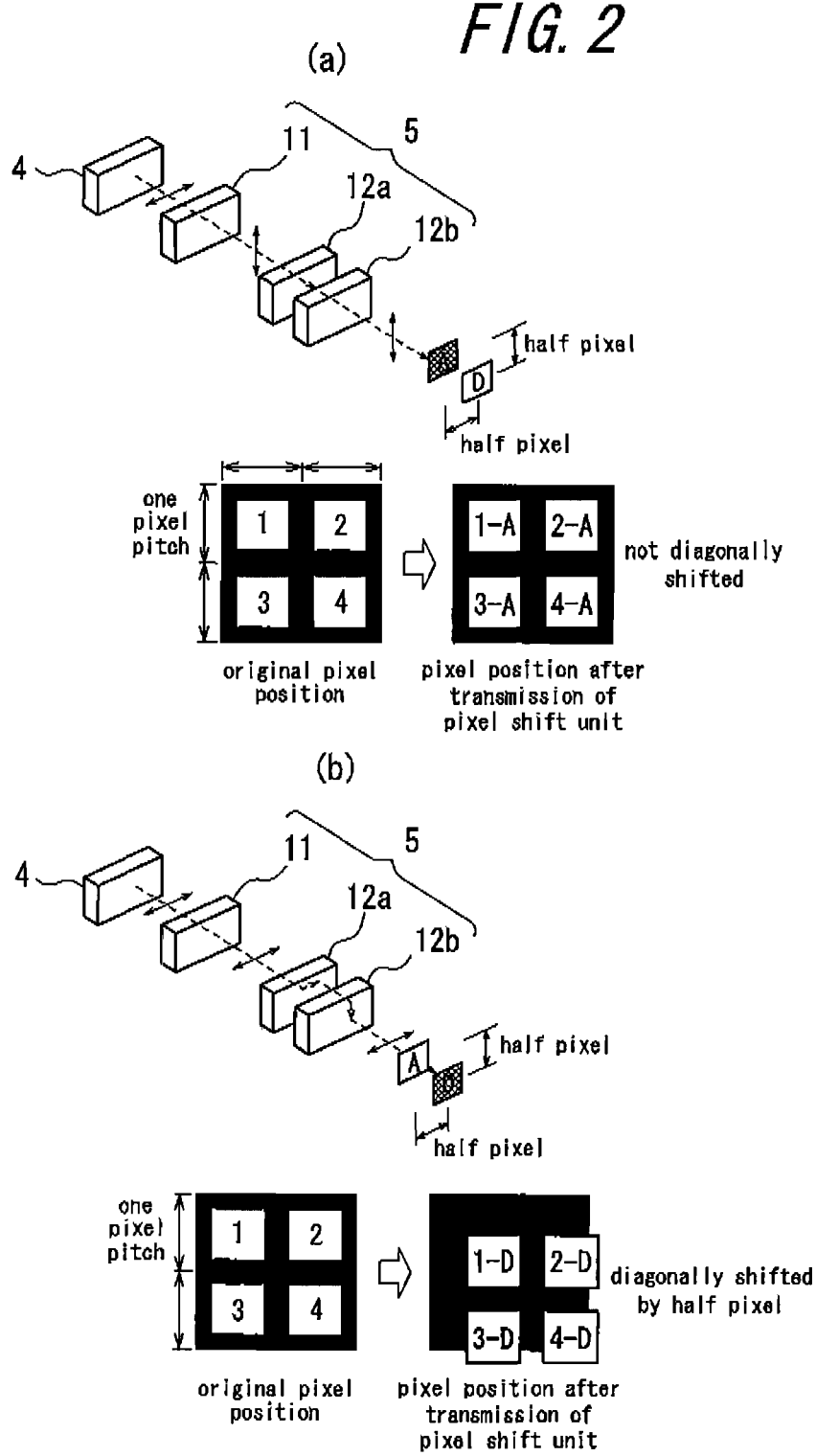
FIG. 2 is a view showing a configuration and operation of a pixel shift unit according to the first embodiment.

Therefore, the pixel shift unit 5 comprises a liquid crystal cell 1 and two birefringent plates 12a, 12b as shown in FIG. 2. The liquid crystal cell 11 is composed, for example, of a TN liquid crystal or a ferroelectric liquid crystal. The liquid crystal cell 11 transmits the incident light with keeping its polarization direction unchanged in the ON state in which voltage is applied to the liquid crystal cell 11, and transmits the incident light with rotating its polarization direction by 90 degrees in the OFF state in which voltage is not applied.

Two birefringent plates 12a, 12b are composed, for example, of an anisotropic crystal such as crystal, lithium niobate, rutile, calcspar, Chile saltpeter and the like. For example, p-polarized incident light is transmitted through the birefringent plate 12a with shifting the pixel position by a half pixel pitch in the horizontal direction, and through the birefringent plate 12b with shifting the pixel position by a half pixel pitch in the vertical direction while s-polarized incident light is transmitted without shifting the pixel position.

When a polarization plane of image light incident on the liquid crystal cell 11 from the image display unit 4 exists, for example, in the horizontal direction (p-polarized light) and the liquid crystal cell 11 is controlled to be in the OFF state by the pixel shift control unit 7 as shown in FIG. 2a, the polarization plane of the image light incident from the image display unit 4 is rotated by 90 degrees by the liquid crystal cell 11 to be in the vertical direction (s-polarized light). As a result, observation pixel positions of the pixels 1 to 4 of the image light incident on the liquid crystal cell 11 are pixel positions 1-A to 4-A respectively, without being shifted by the birefringent plates 12a, 12b when the image light is transmitted through the birefringent plates 12a, 12b.

On the other hand, in the state that the liquid crystal cell 11 is controlled to be in the ON state by the pixel shift control unit 7 as shown in FIG. 2b, the polarization plane of the image light incident from the image display unit 4 is not rotated by the liquid crystal cell 11 and the p-polarized light is transmitted as it is. Accordingly, the pixel position is shifted by a half pixel pitch in the horizontal direction by the birefringent plate 12a and further shifted by a half pixel pitch in the vertical direction by the birefringent plate 12b. As a result, the observation pixel positions of pixels 1 to 4 of the image light incident on the liquid crystal cell 11 are respectively shifted to the diagonal pixel positions 1-D to 4-D by the pixel shift unit 5.

In addition, since the pixel shift unit 5 performs 2-point pixel shift in each frame of the imaging element 1, the readout control unit 6 controls the imaging element 1 in such a manner that the imaging element 1 is interlaced, that each frame is divided into two fields of the field A and field D, each having a different readout position, that image signal of each field is readout by sub-sampling pixels in the horizontal direction depending on the pixel shift amount by the pixel shift unit 5 or the display position relation, and that image signals of two fields of the field A and field D, each having a different spatial and temporal phase, are obtained.

Figure 3:
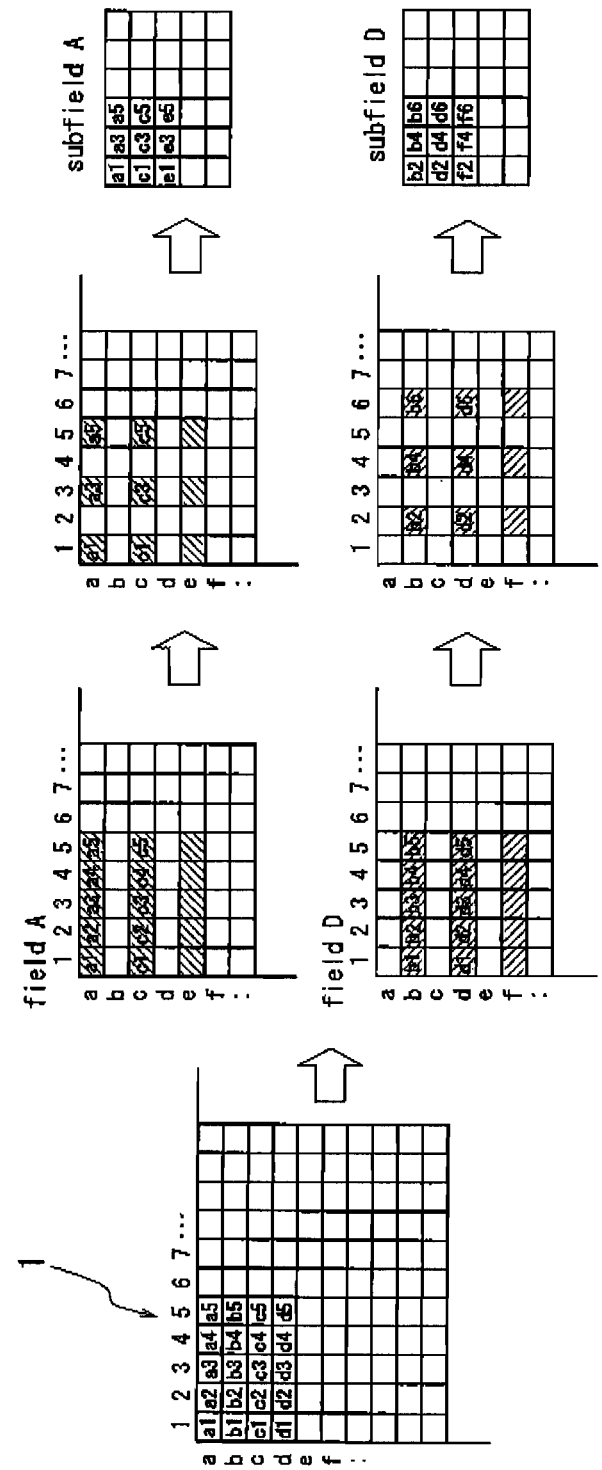
FIG. 3 is a view illustrating readout operation of an imaging element according to the first embodiment.

That is to say, assuming that the sequential horizontal lines of the imaging element 1 are a, b, c, . . . , and that the sequential vertical lines are 1, 2, 3, . . . , as shown in FIG. 3, horizontal lines of odd rows a, c, e, . . . , in the first field A of each frame are selected and the selected horizontal lines are readout by sub-sampling every other pixel in such a manner that, for example, pixels of odd columns are readout. Similarly, in the next field D horizontal lines of even rows b, d, f, . . . , are selected and the selected horizontal lines are readout by sub-sampling every other pixel in such a manner that, for example, pixels of even columns are readout.

In this way, the image processing unit 2 processes image signal of the field A having a different readout position sequentially readout from the imaging element 1 and image signal of the field D having the diagonally shifted spatial and temporal phase with respect to the field A as mentioned above to generate image data. Thus-generated image data is sequentially converted to image data of the subfield A and the subfield D having the suitable size for the pixel count of the image display unit 4 by the image output unit 3 and thus-converted image data is output to the image display unit 4 at the timing synchronized with pixel shift operation by the pixel shift unit 5. Accordingly, an image of the subfield A of each frame is displayed as shown in FIG. 2a and an image of the subfield D is displayed as shown in FIG. 2b.

The timing generator 9 controls the output timing of the image signal from the imaging element 1 in synchronization with control signal supplied from the pixel shift control unit 7 to the pixel shift unit 5 in such a manner that the readout position of the field A is different from that of the field D. In this way, the image signals of the field A and the field D, each of which has a different readout position, are sequentially readout from the imaging element 1, supplied to and sequentially processed in the image processing unit 2, processed in the image output unit 3 and then supplied to the image display unit 4. Next, thus-processed image signals are displayed by performing 2-point pixel shift by pixel shift unit 5 in such a manner that the image of the subfield A of the sequential frame is displayed in the original pixel position without being shifted and the image of the subfield D is shifted to the diagonal pixel position both in the horizontal and vertical directions respectively by a half pixel pitch.

Figure 4:
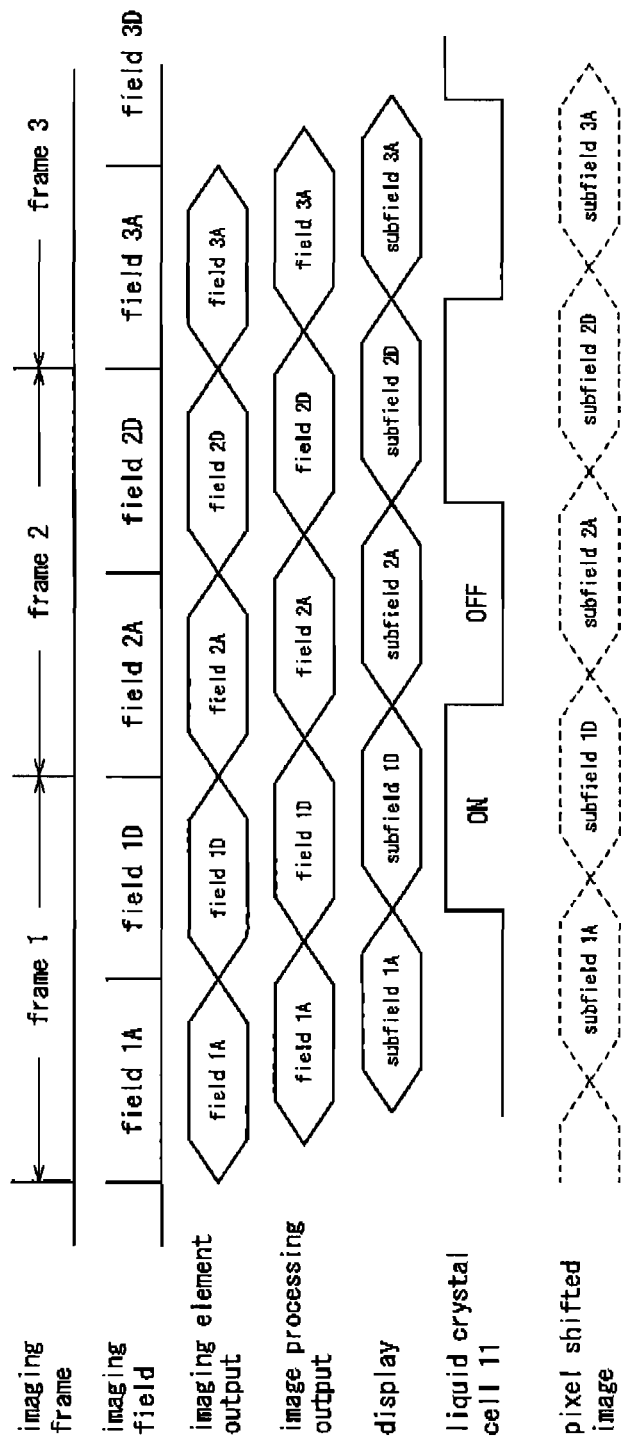
FIG. 4 is a timing chart showing imaging display operation according to the first embodiment.

FIG. 4 is a timing chart showing operation of the imaging display device according to this embodiment. In this embodiment, frame data of the imaging element is not stored once in a frame memory unlike the conventional case. A readout position of the imaging element 1 is controlled while the image display unit 4 and the pixel shift unit 5 are controlled, and each frame of the imaging element 1 is readout and displayed by performing 2-point pixel shift in such a manner that each frame is divided into two fields by interlacing and pixels of each field are sub-sampled in columns. With this, delay time from imaging to displaying can be shortened within one field as shown in FIG. 4. In addition, since each field is readout in a different readout position, it is possible to raise spatial resolution and motion resolution of the image to be displayed, in which the pixels are shifted.

In the above-mentioned description, pixels in the horizontal direction are sub-sampled simultaneously when the image signal of each field is readout from the imaging element 1. However, image signal of each field from the imaging element 1 is readout without sub-sampling pixels in the horizontal direction, afterward, pixels of each field in the horizontal direction can be sub-sampled in the image processing unit 2 and the image output unit 3.

Second Embodiment

In the second embodiment of the present invention, the imaging element 1 has the pixel count of 1,920×1,080 pixels and the pixel count of the image display unit 4 is not more than ½ of the pixel count of the imaging element 1 both in the horizontal and vertical directions in the arrangement shown in FIG. 1. The pixel shift unit 5 performs 4-point pixel shift under the control of the pixel shift control unit 7 in such a manner that display pixel positions of an image of the image display unit 4 are shifted to four points in each frame of the imaging element 1, that is, the original pixel position not shifted, a pixel position spatially shifted by a half pixel pitch in the horizontal direction from the original pixel position, a pixel position spatially shifted by a half pixel pitch in the vertical direction from the original pixel position, and a pixel position spatially shifted by a half pixel pitch both in the horizontal and vertical directions from the original pixel position.

For this purpose, the pixel shift unit 5 comprises a pixel shift set in the horizontal direction having a liquid crystal cell 21a and a birefringent plate 22a and a pixel shift set in the vertical direction having a liquid crystal cell 21b and a birefringent plate 22b as shown in FIG. 5. The liquid crystal cells 21a, 21b are composed, for example of a TN liquid crystal or a ferroelectric liquid crystal same as the liquid crystal cell 11 shown in FIG. 2. The liquid crystal cells 21a, 21b transmits the incident light with keeping its polarization direction unchanged in the ON state in which voltage is applied by the pixel shift control unit 7 and transmits the incident light with rotating its polarization direction by 90 degrees in the OFF state in which voltage is not applied.

The birefringent plates 22a, 22b are composed, for example, of an anisotropic crystal such as crystal, lithium niobate, rutile, calcspar, Chile saltpeter and the like as in the birefringent plates 12a, 12b shown in FIG. 2. The birefringent plate 22a shifts polarized light having a horizontal polarization plane (p-polarized light) by a half pixel pitch in the horizontal direction and transmits polarized light having a vertical polarization plane (s-polarized light) without shifting. On the other hand, the birefringent plate 22b shifts s-polarized light by a half pixel pitch in the vertical direction and transmits p-polarized light without shifting.

In this way, when the polarization plane of image light emitted from the image display unit 4 exits in the horizontal direction (p-polarized light), and both of the liquid crystal cell 21a for pixel shift in the horizontal direction and the liquid crystal cell 21b for pixel shift in the vertical direction are controlled to be in the OFF state, the image light incident from the image display unit 4 is rotated by 90 degrees by the liquid crystal cell 21a to be s-polarized light, the s-polarized light is transmitted through the birefringent plate 22a without pixel shift and rotated by 90 degrees by the liquid crystal cell 21b to be p-polarized light and then the p-polarized light is transmitted through the birefringent plate 22b without pixel shift as shown in FIG. 5a. As a result, the image is displayed in such a manner that the observation pixel positions after transmission through the pixel shift unit 5 are in the same positions 1-A to 4-A as the original pixel positions 1 to 4 before transmission.

When both of the liquid crystal cells 21a, 21b are in the ON state, the p-polarized image light incident from the image display unit 4 is transmitted through the liquid crystal cell 21a without rotating its polarization plane, shifted by a half pixel pitch in the horizontal direction by the birefringent plate 22a, transmitted through the liquid crystal cell 21b as p-polarized light without rotating its polarization plane and then transmitted through the birefringent plate 22b without pixel shift as shown in FIG. 5b. As a result, the image is displayed in such a manner that the observation pixel positions after transmission through the pixel shift unit 5 are in the positions 1-B to 4-B, each of which is shifted by a half pixel pitch in the horizontal direction from each of the original pixel positions 1 to 4 before transmission.

When the liquid crystal cell 21a is in the OFF state and the liquid crystal cell 21b is in the ON state, the p-polarized image light incident from the image display unit 4 is rotated by 90 degrees of its polarization plane by the liquid crystal cell 21a to be s-polarized light, transmitted through the birefringent plate 22a without pixel shift, transmitted through the liquid crystal cell 21b as s-polarized light and then shifted by a half pixel pitch in the vertical direction by the birefringent plate 22b as shown in FIG. 5c. As a result, the image is displayed in such a manner that the observation pixel positions after transmission through the pixel shift unit 5 are in the positions 1-C to 4-C, each of which is shifted by a half pixel pitch in the vertical direction from each of the original pixel positions 1 to 4 before transmission.

When the liquid crystal cell 21a is in the ON state and the liquid crystal cell 21b is in the OFF state, the p-polarized image light incident from the image display unit 4 is transmitted through the liquid crystal cell 21a without rotating its polarization plane, shifted by a half pixel pitch in the horizontal direction by the birefringent plate 22a, rotated by 90 degrees by the liquid crystal cell 21b to be s-polarized light and shifted by a half pixel pitch in the vertical direction by the birefringent plate 22b as shown in FIG. 5d. As a result, the image is displayed in such a manner that the observation pixel positions after transmission through the pixel shift unit 5 are in the positions 1-D to 4-D, each of which is shifted by a half pixel pitch in the horizontal and vertical directions from each of the original pixel positions 1 to 4 before transmission.

The timing generator 9 controls an output timing of image signals from the imaging element 1 in synchronization with the control signal supplied from the pixel shift control unit 7 to the pixel shift unit 5 in such a manner that the readout positions in the fields A, B, C and D are different with each other.

Figure 6:
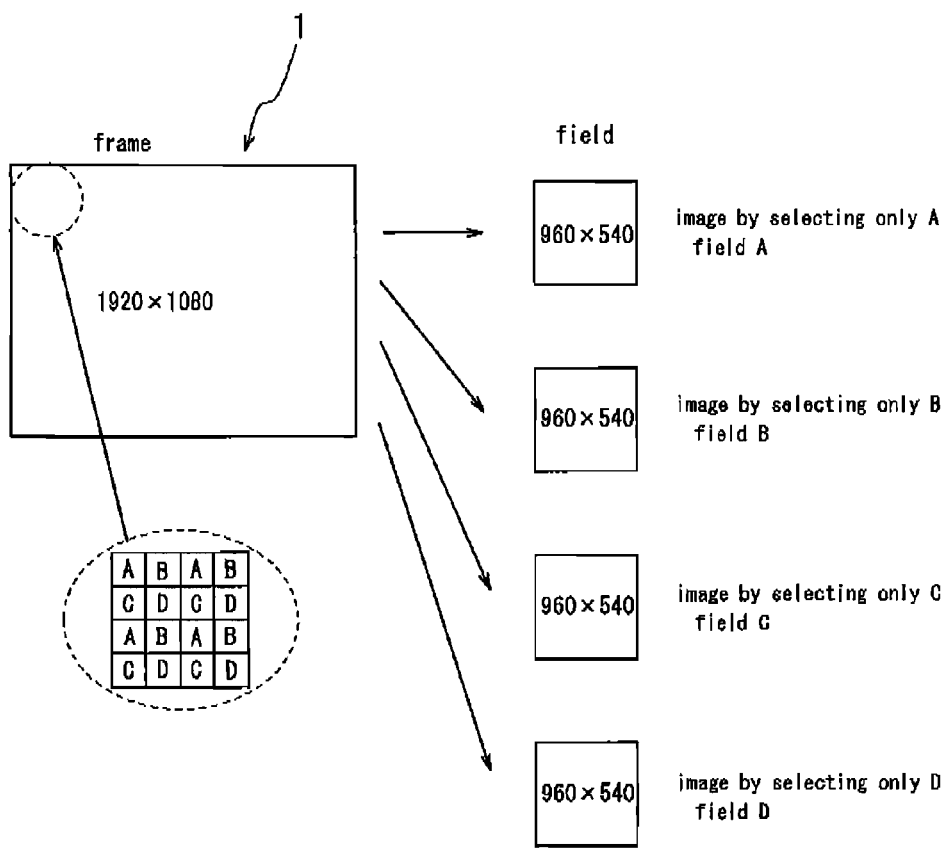
FIG. 6 is a view illustrating readout operation of an imaging element according to the second embodiment.
Figure 7:
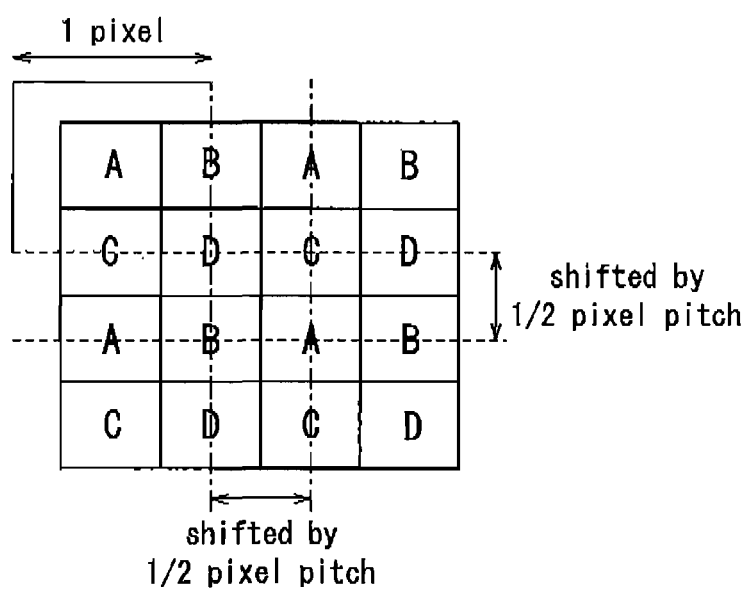
FIG. 7 is a view showing spatial phase relationship of fields A to D according to the second embodiment.

In this way, each frame of the imaging element 1 having 1,920×1,080 pixels is divided into four fields, that is, the field A corresponding to pixels A, the field B corresponding to pixels B, the field C corresponding to pixels C and the field D corresponding to pixels D, each having a different spatial and temporal phase depending on the pixel of 4-point pixel shift by the readout control unit 6 as shown in FIG. 6, and the image signal of each field is readout. In other words, as the spatial phase relationship of the fields A to D is shown in FIG. 7, the readout positions of the imaging element 1 are made different in such a manner that the barycenter of each synchronized pixel in the fields A to D is spatially shifted by ½ phase with each other. Accordingly, the pixel count of each field becomes 960×540 pixels.

In this embodiment, in each frame of the imaging element 1 the observation pixels of the image display unit 4 are clockwise shifted in the order of the pixel positions A, B, D and C shown in FIG. 5 by the pixel shift unit 5 so that the readout positions in the fields A, B, D and C are made different in this order and the image signals are readout from the imaging element 1 in this order.

As is the case with the first embodiment, the image processing unit 2 processes image signal of each field sequentially readout from the imaging element 1 to generate image data, the image output unit 3 converts thus-generated image data to image data of subfields having the suitable size for the pixel count of the image display unit 4 and outputs the converted data to the image display unit 4 at the timing synchronized with 4-point pixel shift operation by the pixel shift unit 5. In each frame, the sequentially readout image of the subfield A corresponding to the field A is displayed in the pixel position A shown in FIG. 5a, the image of the subfield B corresponding to the field B is displayed in the pixel B shown in FIG. 5b, the image of the subfield D corresponding to the field D is displayed in the pixel D shown in FIG. 5d, and the image of the subfield C corresponding to the field C is displayed in the pixel C shown in FIG. 5c by 4-point pixel shift.

Figure 8:
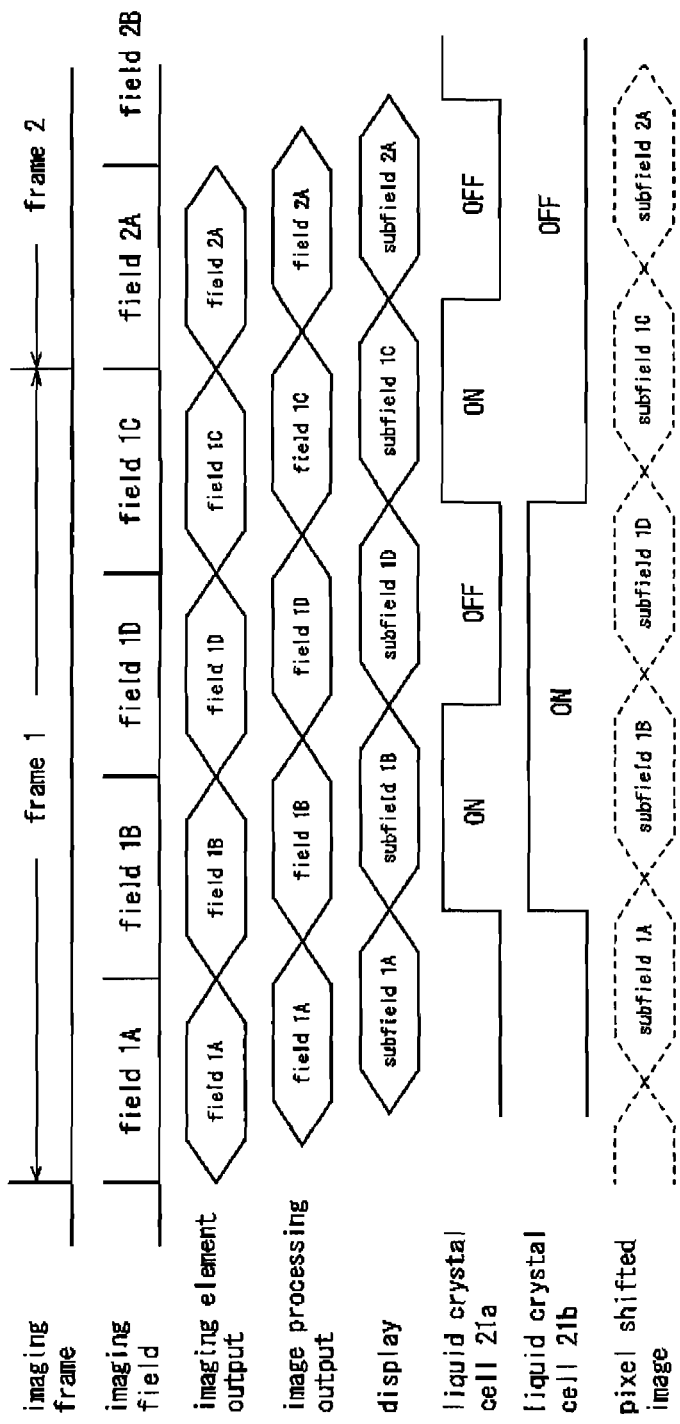
FIG. 8 is a timing chart showing imaging display operation according to the second embodiment.

FIG. 8 is a timing chart showing the operation of the imaging display device according to this embodiment. Also in this embodiment like the first embodiment, frame data of the imaging element is not stored once in a frame memory. A readout position of the imaging element 1 is controlled while the image display unit 4 and the pixel shift unit 5 are controlled, and each frame of the imaging element 1 is readout by the field and displayed with pixels being shifted. Therefore, as shown in FIG. 8, delay time from imaging to displaying can be shortened within one field. In addition, it is possible to raise spatial resolution and motion resolution of the image in comparison to the case of 2-point pixel shift of the first embodiment since each frame of the imaging element 1 is divided into four fields, each having a different readout position, and each field is sequentially readout and then displayed by performing 4-point pixel shift in this embodiment.

Third Embodiment

In the third embodiment of the present invention, as is the case with the second embodiment, 4-point pixel shift is performed for each frame of the imaging element 1 in the arrangement shown in FIG. 1. The readout control unit 6 interlaces the imaging element 1, divides the interlaced signal into two fields and readouts the image signals in such a manner that readout positions of the two fields are made different by the timing generator 9. Afterwards, in the image processing unit 2 and the image output unit 3 the image data of each field is sub-sampled in columns and converted into image data having the suitable size for the pixel count of the image display unit 4 so that image data of two subfields is generated. With this, the image data of the subfield A, the subfield B, the subfield D and the subfield C in each frame corresponding to pixel positions of 4-point pixel shift by the pixel shift unit 5 is sequentially generated and displayed by performing 4-point pixel shift by the image display unit 4 and the pixel shift unit 5.

Figure 9:
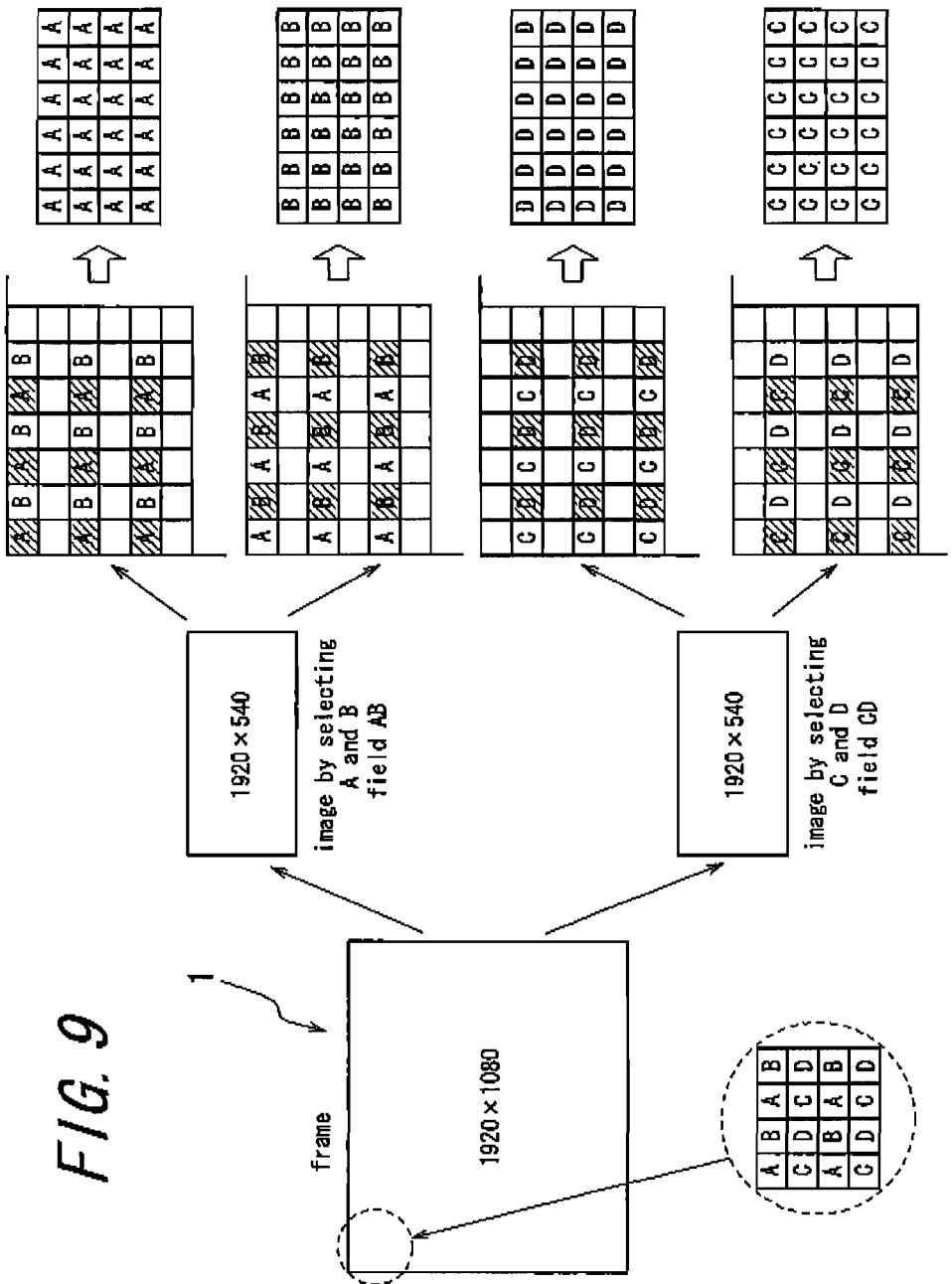
FIG. 9 is a view illustrating readout operation of an imaging element according to a third embodiment.

In other words, as shown in FIG. 9, each frame of the imaging element 1 having 1,920×1,080 pixels is divided into the field AB comprising odd lines corresponding to pixels A and B and into field CD comprising even lines corresponding to pixels C and D in 4-point pixel shift and the image signal of each field is sequentially readout. Therefore, the pixel count of each field of this case becomes 1,920×540 pixels.

Afterward, the image processing unit 2 processes image signal of each filed having a different spatial and temporal phase sequentially readout from the imaging element 1 to generate image data. The image output unit 3 converts thus-generated image data to image data of the subfields having the suitable size for the pixel count of the image display unit 4

At that time, the image data of the field AB is stored once in a field memory, for example, sub-sampled in columns and readout. Afterward, the image data of the subfield A corresponding to pixels A and the image data of the subfield B corresponding to pixel B, each having 960×540 pixels, are sequentially generated and the image data of these subfields A, B is converted to image data having the suitable size for the pixel count of the image display unit 4 by the image output unit 3 and then sequentially output to the image display unit 4 at the timing synchronized with pixel shift operation by the pixel shift unit 5.

Similarly, the image data of the field CD is stored once in a field memory, for example, sub-sampled in columns and readout. Afterward, the image data of the subfield D corresponding to pixels D and the image date of the subfield C corresponding to pixel C, each having 960×540 pixels, are sequentially generated and the image data of these subfields D and C is converted to image data having the suitable size for the pixel count of the image display unit 4 by the image output unit 3 and then sequentially output to the image display unit 4 at the timing synchronized with pixel shift operation by the pixel shift unit 5.

Figure 10:
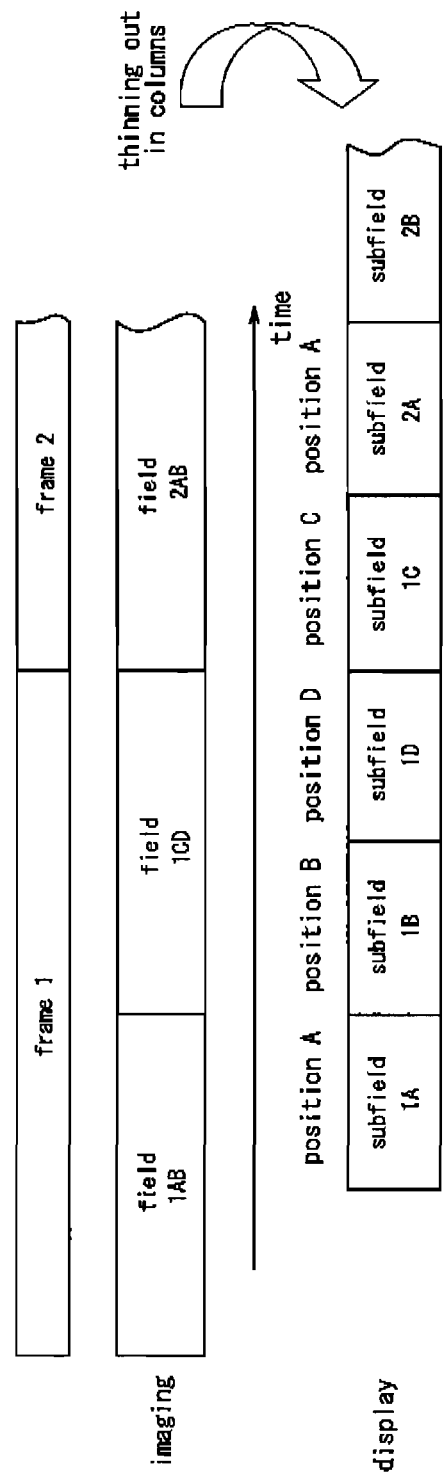
FIG. 10 is a timing chart showing imaging display operation according to the third embodiment.

FIG. 10 is a timing chart showing the operation of the imaging display device according to this embodiment. According to this embodiment, as is the case with the first embodiment, each frame of the imaging element 1 is sequentially readout by the field by interlacing, and image data of each field is sub-sampled by columns. For each frame, image data of four subfields corresponding to 4-point pixel shift is generated to be sequentially displayed. Therefore, as shown in FIG. 10, delay time from imaging to displaying can be shortened within one field as is the case with the above-mentioned embodiments. In addition, as for spatial resolution of a displayed image, it is possible to provide the similar spatial resolution to that in the second embodiment since 4-point pixel shift is performed in one frame and, as for motion resolution, it is possible to provide the similar motion resolution to that in the first embodiment since reading positions in the fields AB and CD of each frame are different with each other.

Fourth Embodiment

Figure 11:
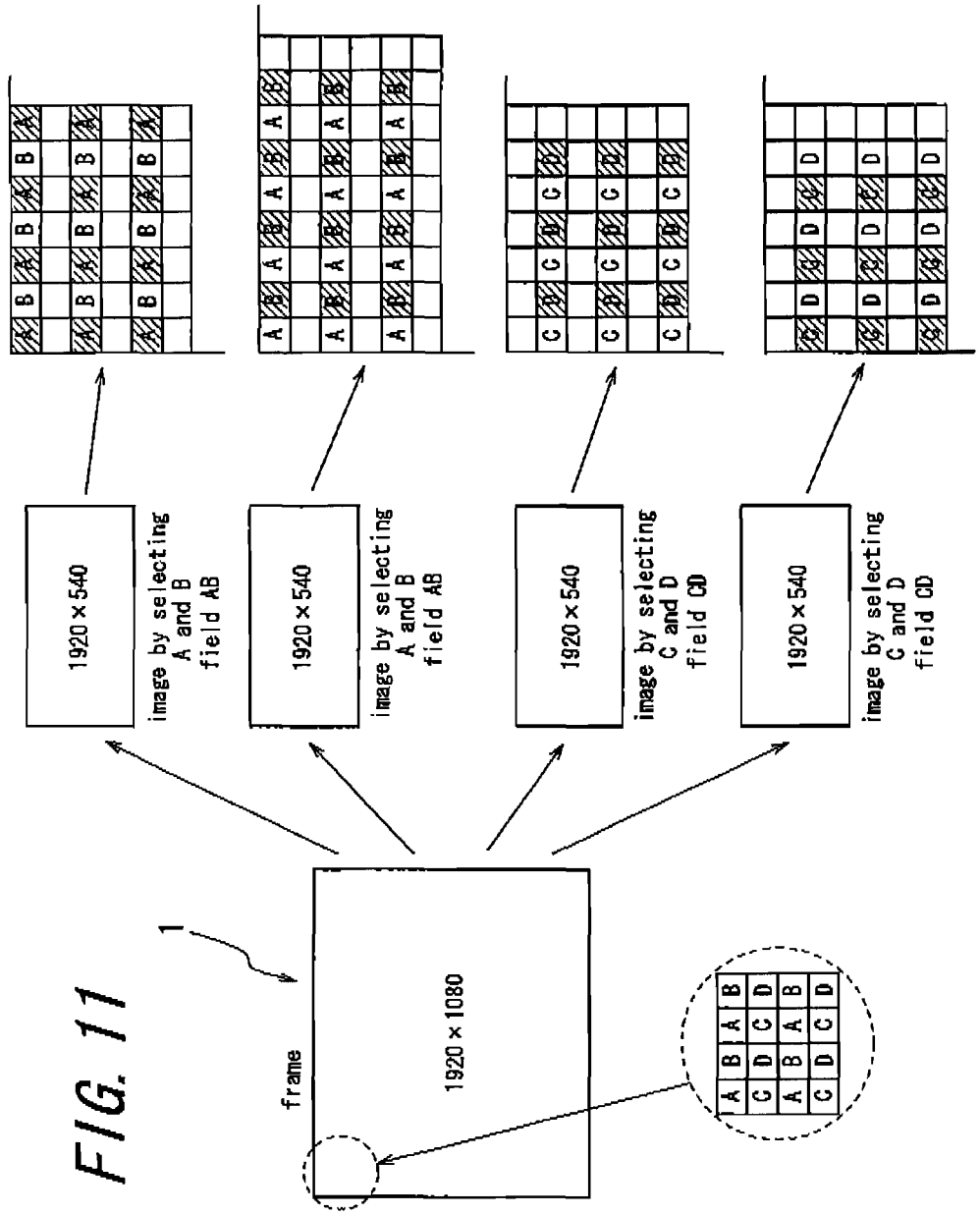
FIG. 11 is a view illustrating readout operation of an imaging element according to a fourth embodiment.

In the fourth embodiment of the present invention, as is the case with the third embodiment, in the arrangement shown in FIG. 1 each frame of the imaging element 1 is divided into the field AB and the field CD to be readout. In addition, in this embodiment the field AB is readout twice in succession and then the field CD is similarly readout twice in succession as shown in FIG. 11.

The firstly readout image data of the field AB is sub-sampled by columns and the image data of the subfield A corresponding to pixels A of 4-point pixel shift is generated by the pixel shift unit 5. The secondarily readout image data of the field AB is sub-sampled by columns and the image data of the subfield B corresponding to pixels B of 4-point pixel shift is generated. Similarly, the firstly readout image data of the field CD is sub-sampled by columns and the image data of the subfield D corresponding to pixels D of 4-point pixel shift is generated and then the secondarily readout image data of the field CD is sub-sampled by columns and the image data of the subfield C corresponding to pixels C of 4-point pixel shift is generated.

In this way, for each frame, image data of the subfields A, B, D and C corresponding to pixel positions of 4-point pixel shift by the pixel shift unit 5 is sequentially generated and displayed by performing 4-point pixel shift by the image display unit 4 and the pixel shift unit 5.

Figure 12:
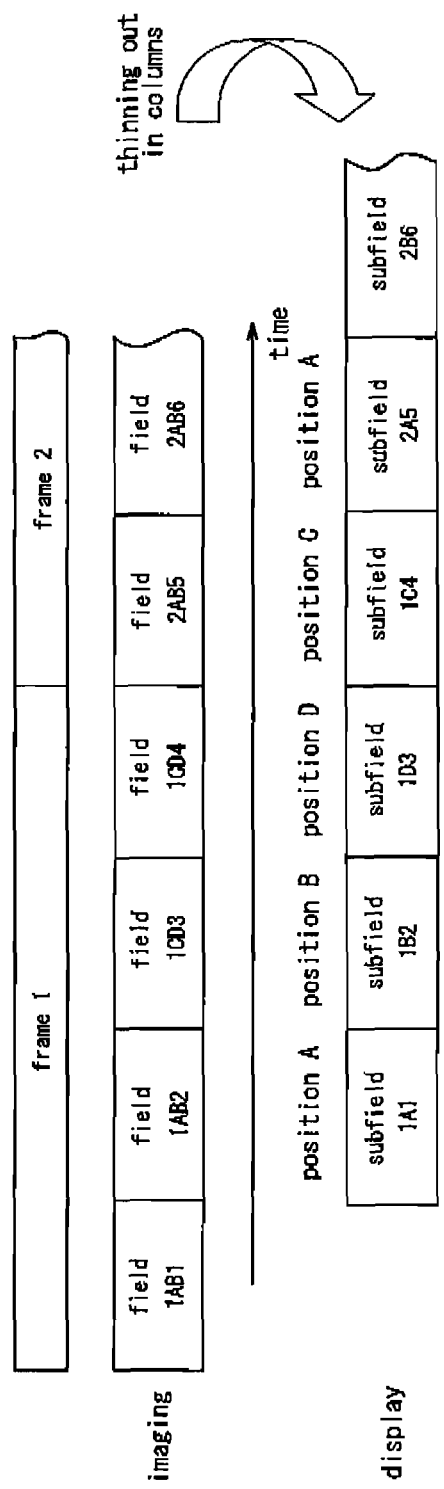
FIG. 12 is a timing chart showing imaging display operation according to the fourth embodiment.

FIG. 12 is a timing chart showing the operation of the imaging display device according to this embodiment. According to this embodiment, delay time from imaging to displaying can be shortened to approximately one field (=¼ frame). In addition, since image data of four subfields for display is acquired from four fields, each having a different readout position, the similar motion resolution to that in the second embodiment can be provided.

Fifth Embodiment

In the fifth embodiment of the present invention, the imaging element 1 constitutes a Bayer color filter array to have 4,096×2,400 pixels in the arrangement shown in FIG. 1. As is the case with the second embodiment, each frame of this imaging element 1 is divided into four fields, each having a different readout position, namely a different spatial and temporal phase to be readout. The four readout fields are displayed by performing 4-point pixel shift using the image display unit 4 having the pixel count of 1,024×600 for each of R, G and B.

Figure 13:
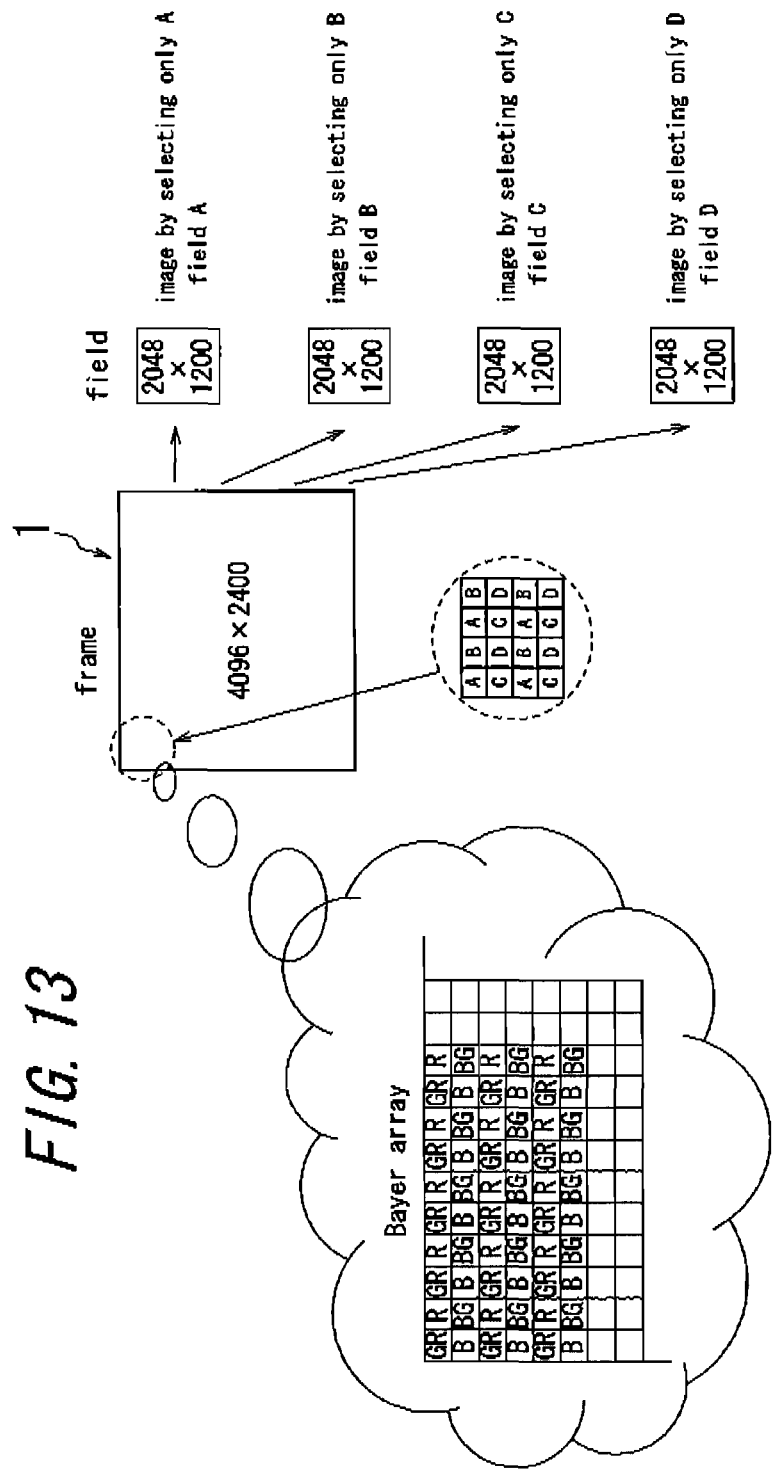
FIG. 13 is a view illustrating readout operation of an imaging element according to a fifth embodiment.

Therefore, in this embodiment, as shown in FIG. 13, taking 2×2 pixels (R, GR, GB and B in this embodiment) of a Bayer array of the imaging element 1 as a block, each frame of the imaging element 1 is divided into four fields of the field A corresponding to pixel positions A, the field B corresponding to pixel positions B, the field C corresponding to pixel positions C, and the field D corresponding to pixel positions D in accordance with 4-point pixel shift and then the image signal of each field is readout. Therefore, the pixel count of each field becomes 2,048×1,200 pixels.

The image processing unit 2 processes image signal of each field sequentially readout from the imaging element 1 to generate synchronized image data including RGB color information from each block of a Bayer array and the image output unit 3 converts thus-generated image data to image data of subfields having the suitable size for the pixel count of the image display unit 4 and then outputs the converted data to the image display unit 4 at the timing synchronized with 4-point pixel shift operation by the pixel shift unit 5. Therefore, the pixel count of each subfield in this case becomes 1,024×600 pixels. Synchronization as used herein means generation of data having RGB color information in the same pixel position.

Figure 14:
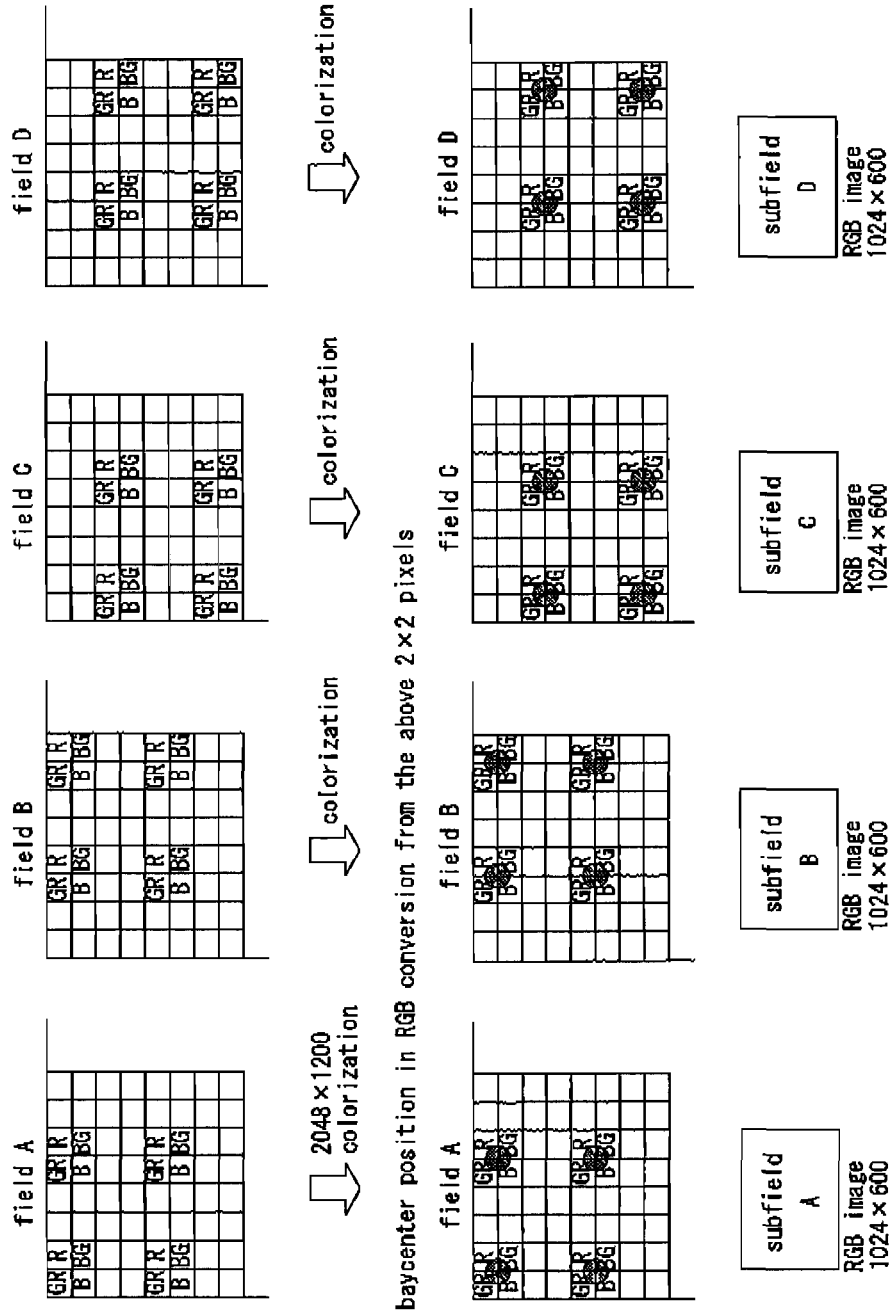
FIG. 14 is a view showing relationship of a pixel spatial phase on generating an RGB image according to the fifth embodiment.
Figure 15:
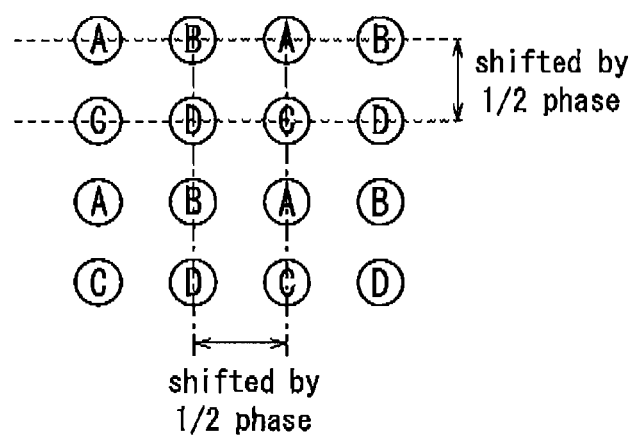
FIG. 15 is a view showing spatial position relationship of each field of an RGB image according to the fifth embodiment.

FIG. 14 shows relationship of a pixel spatial phase on generating an RGB image according to this embodiment and FIG. 15 shows spatial position relationship of each field of an RGB image. As is apparent from FIGS. 14 and 15, in this embodiment readout positions of the imaging element 1 are made different in such a manner that the barycenters of the synchronized pixels in the fields A to D are spatially shifted by ½ phase with each other. Although synchronization is done in 2×2 pixels in this embodiment, other pixels such as 7×7 pixels may be used as one block.

In this embodiment, in each frame of the imaging element 1, the pixel position of the image display unit 4 is clockwise shifted by the pixel shift unit 5 in the order of the pixel positions A, B, D and C shown in FIG. 5 so that the readout positions in the fields A, B, D and C are made different in this order and image signals are readout from the imaging element 1 in this order. When shifted in the order of pixels A, B, C and D, image signals are readout from the imaging element 1 in the order of the fields A, B, C and D.

In this way, as is the same with the second embodiment, in each frame the sequentially readout image of the subfield A corresponding to the field A is displayed in the pixel position A shown in FIG. 5a, the image of the subfield B corresponding to the field B is displayed in the pixel B shown in FIG. 5b, the image of the subfield D corresponding to the field D is displayed in the pixel D shown in FIG. 5d, and the image of the subfield C corresponding to the field C is displayed in the pixel C shown in FIG. 5c by 4-point pixel shift.

Figure 16:
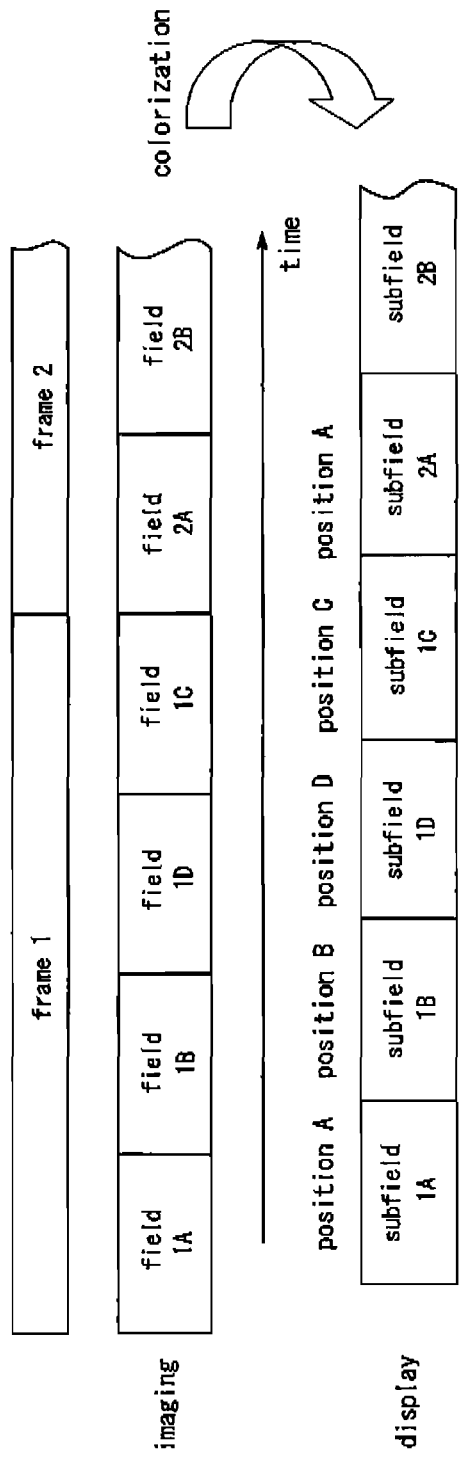
FIG. 16 is a timing chart showing imaging display operation according to the fifth embodiment.

FIG. 16 is a timing chart showing the operation of the imaging display device according to this embodiment. According to this embodiment, as is the case with the second embodiment, each frame of the imaging element 1 is divided into four fields, each having a different readout position, and each field is sequentially readout and displayed by performing 4-point pixel shift so that delay time from imaging to displaying can be shortened within one field and spatial resolution and motion resolution of a displayed image can be raised.

Sixth Embodiment

In the sixth embodiment of the present invention, as is the case with the fifth embodiment, in the arrangement shown in FIG. 1, each frame is divided into four fields, each having a different readout position and readout using the imaging elements 1 of 4,096×2,400 pixels having a Bayer color filter array. The readout image is displayed by performing 4-point pixel shift using the image display unit 4 having the pixel count of 1,024×600 for each of R, G and B. In addition, in this embodiment, when image signal of the field corresponding to each pixel position of 4-point pixel shift is readout from the imaging element 1, the readout control unit 6 controls that the horizontal lines are sub-sampled to ¼ and 4,096×600 pixels are readout.

Figure 17:
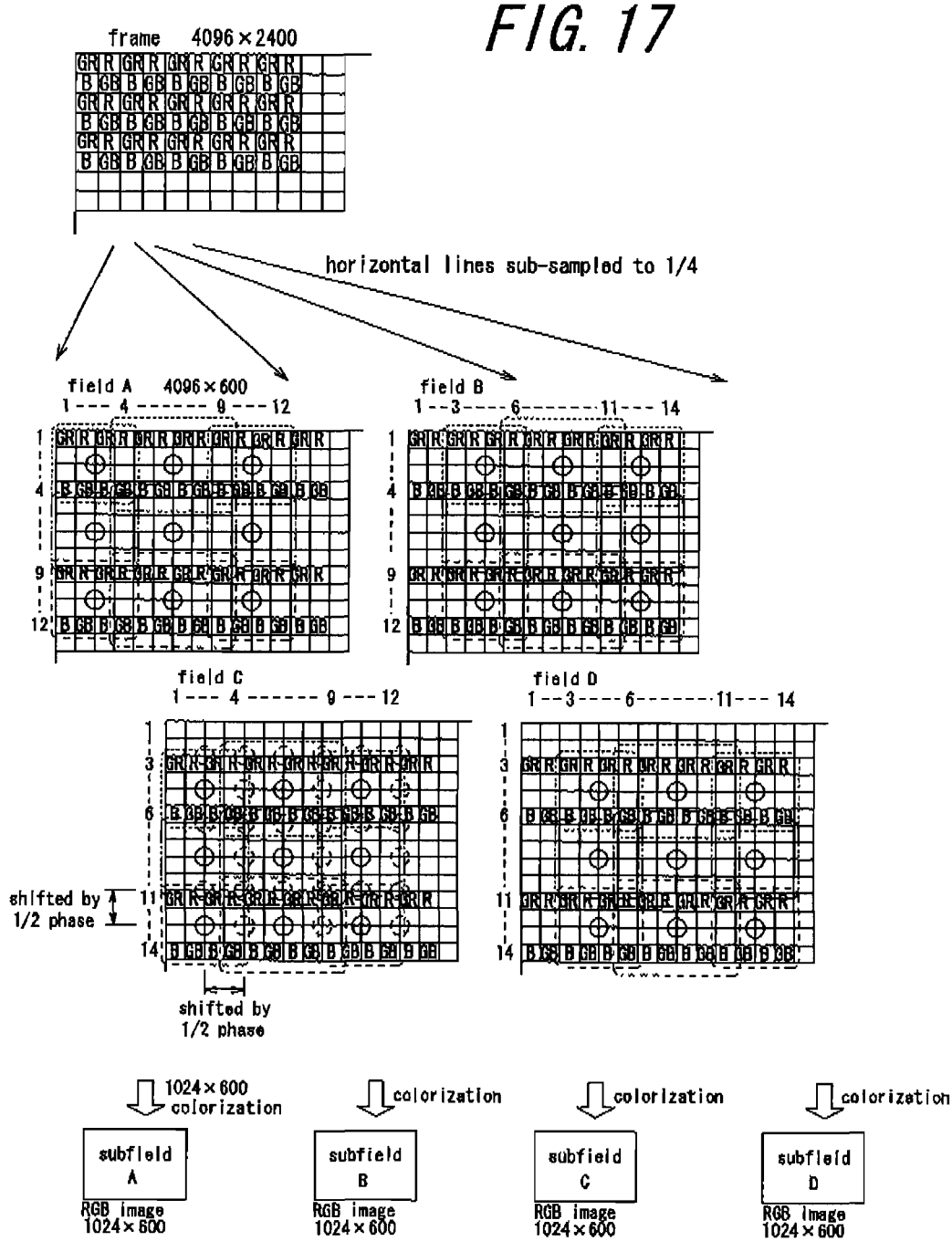
FIG. 17 is a view illustrating readout operation of an imaging element according to a sixth embodiment.

For example, as shown in FIG. 17, in the field A and the field B respectively corresponding to pixels A and pixels B of 4-point pixel shift, (1+8n)th horizontal lines and (4+8n)th horizontal lines are readout and in the field C and the field D respectively corresponding to pixels C and pixels D of 4-point pixel shift, (3+8n)th horizontal lines and (6+8n)th horizontal lines are readout (n is a positive integer including 0).

In the image processing unit 2, for the image signal of the field A readout from the imaging element 1, pixel signal of (1+8n)th vertical lines and (4+8n)th vertical lines are extracted so that 2×2 synchronized image data including RGB color information is generated by combining the adjacent 2×2 pixels (8×8 pixels and the like are also possible) constituting a Bayer array. At this time, synchronized image data of 1,024×600 pixels of the subfield A is generated by adding or sub-sampling adjacent pixel data having the same color in the horizontal direction. In other words, as typically show in FIG. 17, 2×2 synchronized image data including RGB color information is generated by respectively combining 2×2 pixels (GR, B, R, GB) in four corners of a block comprising 4×4 pixels in broken lines, 2×2 pixels (R, GB, GR, B) in four corners of a block comprising 6×4 pixels in broken lines, 2×2 pixels (B, GR, GB, R) in four corners of a block comprising 4×6 pixels in broken lines and 2×2 pixels (GB, R, B, GR) in four corners of a block comprising 6×6 pixels in broken lines. Pixels of each block are overlapped with pixels of the adjacent block. In case of low sensitivity, adjacent pixels having the same color are added and R, GB, GR, B are generated as one block.

Similarly, for the image signal of the field B readout from the imaging element 1, pixel signal of (3+8n)th vertical lines and (6+8n)th vertical lines are extracted so that, as in the case of the field A, 2×2 synchronized image data of 1,024×600 pixels of the subfield B including RGB color information is generated by combining the adjacent 2×2 pixels constituting a Bayer array.

For the image signal of field C readout from the imaging element 1, as in the case of the field A pixel signal of (1+8n)th vertical lines and (4+8n)th vertical lines are extracted so that 2×2 synchronized image data of 1,024×600 pixels of the subfield C including RGB color information is generated by combining the adjacent 2×2 pixels constituting a Bayer array as in the case of the field A.

Similarly, for the image signal of the field D readout from the imaging element 1, as in the case of the field B, pixel signal of (3+8n)th vertical lines and (6+8n)th vertical lines are extracted so that 2×2 synchronized image data of 1,024×600 pixels of the subfield D including RGB color information is generated by combining the adjacent 2×2 pixels constituting a Bayer array as in the case of the field A.

That is to say, the readout positions of the imaging element 1 is made different in such a manner that the barycenters of the synchronized pixel in the fields A to D are spatially shifted by ½ phase with each other. In FIG. 17, in the fields A to D the barycenter of each synchronized pixel is illustrated in the solid circle, and in the field C the barycenters of each synchronized pixel in the other fields A, B and D are illustrated in the dashed circle in order to distinctly show shift of spatial phase.

Thus-generated image data corresponding to each pixel of 4-point pixel shift is converted into image data having the suitable size for the pixel count of the image display unit 4 by the image output unit 3 and output to the image display unit 4 at the timing synchronized with 4-point pixel shift operation by the pixel shift unit 5.

Also in this embodiment, in each frame of the imaging element 1, the pixel position of the image display unit 4 is clockwise shifted by the pixel shift unit 5 in the order of pixel positions A, B, D and C shown in FIG. 5 so that the readout positions in the field A, B, D and C are made different in this order and image signals are readout from the imaging element 1 in this order.

In this way, as is the case with the second embodiment, in each frame the sequentially readout image of the subfield A corresponding to the field A is displayed in the pixel position A shown in FIG. 5a, the image of the subfield B corresponding to the field B is displayed in the pixel position B shown in FIG. 5b, the image of the subfield D corresponding to the field D is displayed in the pixel position D shown in FIG. 5d, and the image of the subfield C corresponding to the field C is displayed in the pixel position C shown in FIG. 5c by 4-point pixel shift.

Figure 18:
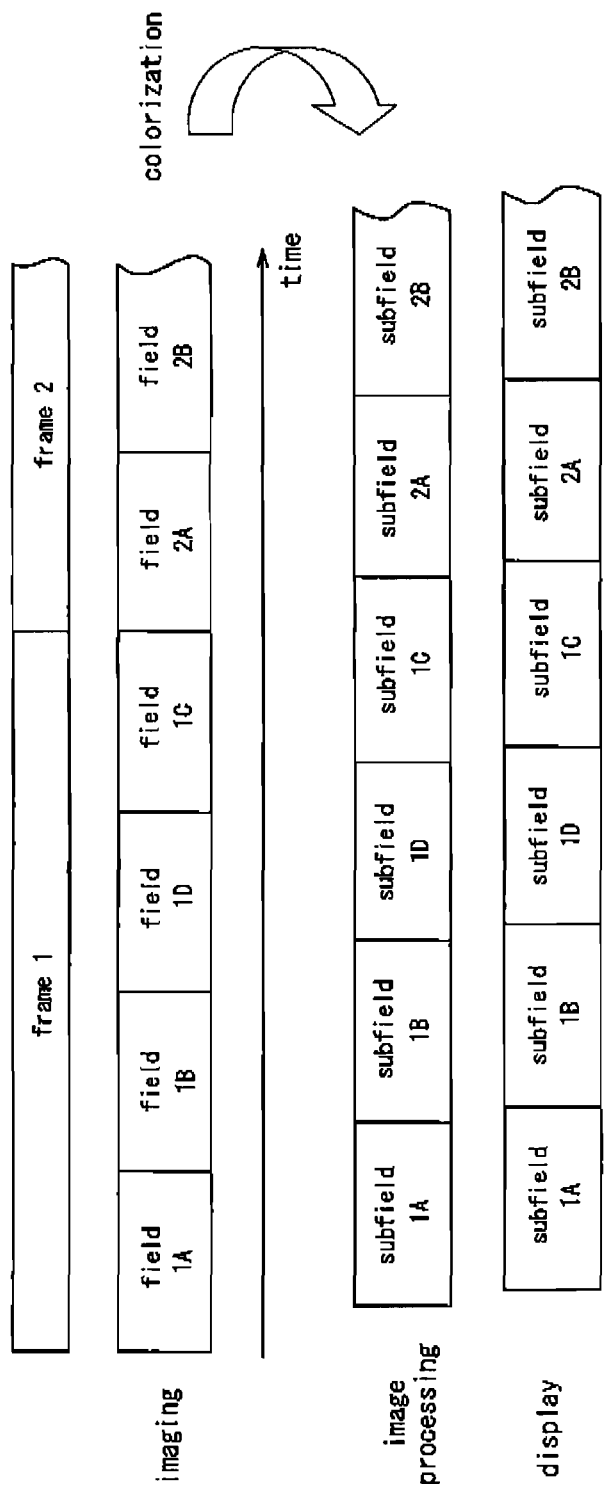
FIG. 18 is a timing chart showing imaging display operation according to the sixth embodiment.
Figure 19:
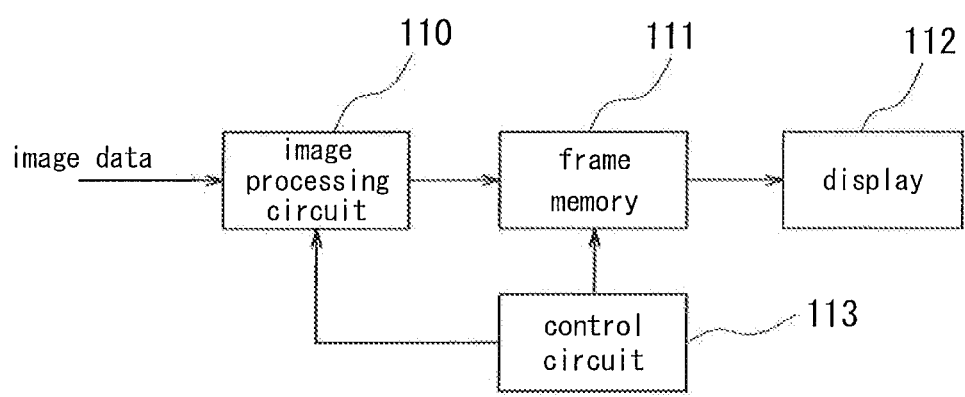
FIG. 19 is a block diagram showing a configuration of a conventional display device for pixel shift.

FIG. 18 is a timing chart showing the operation of the imaging display device according to this embodiment. According to this embodiment, as is the case with the second embodiment, each frame of the imaging element 1 is divided into four fields, each having a different readout position, and each field is sequentially readout and displayed by performing 4-point pixel shift so that delay time from imaging to displaying can be shortened within one field and spatial resolution and motion resolution of a displayed image can be raised.

The present invention is not limited to the above-mentioned embodiments but various modifications are possible. For example, in FIG. 1 the pixel shift unit 5 comprises a liquid crystal cell and birefringent plates so that an optical axis of each pixel of the image display unit 4 can be optically shifted. However, for example, the image display unit 4 in itself may be displaced by using a piezoelectric transducer so that an optical axis of each pixel of the image display unit 4 can be shifted.

In addition, in FIG. 1 the image output unit 3 not only sub-samples image data from the image processing unit 2 to be matched with the pixel count of the image display unit 4 but also processes the image such as scaling when the pixel count of the image display unit 4 is different from that of the image data from the image processing unit 2 or processes the image so that the image has the suitable pixel count by pixel selection to convert the image having the suitable size for the pixel count of the image display unit 4.

In addition, in the second to sixth embodiments the order of pixel shift in 4-point pixel shift operation is not limited to the order of pixel A, pixel B, pixel D, and pixel C as shown in FIG. 5 but arbitrarily determined. The image may be readout in such a manner that readout positions of each field of the imaging element 1 are different with each other depending on the shift order and the shift order may be controlled depending on readout of the imaging element 1.

In the sixth embodiment, in order to easily acquire image data having spatially shifted phase, the readout positions (horizontal lines) of the fields A, B are made different from those of the fields C, D. However, it is also possible to readout image signals of the same readout position and then to acquire data having spatially shifted phase by image processing in generating the subfields A to D. In addition, pixels selected from readout positions (horizontal lines) can be selected so that resolution and color sensitivity become the most suitable or a pixel shifted image becomes in the most suitable condition by addition to improve color sensitivity at the cost of resolution. Therefore, in FIG. 17 a block in each field may be divided depending on desired resolution and color sensitivity and pixels selected from each block to generate RGB image is not limited to 4 pixels of 2×2 but may be 16 pixels of 4×4, 49 pixels of 7×7 and the like.

In the sixth embodiment, when the image processing unit 2 generates RGB image data of each field, the image processing unit 2 does not sub-sample image data in the horizontal direction but the image output unit 3 may sub-sample image data so as to have the suitable pixel count for the image display unit 4. In addition, the image processing unit 2 may generate RGB image data of each field without adding and sub-sampling process and the image output unit 3 may sub-sample the RGB image data to have the suitable pixel count for the image display unit 4.

In the sixth embodiment the ratio of the pixel count of the imaging element 1 to the pixel count of RGB image in the image display unit 4 is four-to-one both in the horizontal and vertical directions. However, the ratio of the pixel count can be six-to-one, for example, by selecting readout lines of the imaging element 1 or by changing the sub-sampling process. In case that an RGB image is displayed on a general-purpose display such as an LCD, resizing process is added in image processing such as a demosicing process to obtain the RGB image having a desired pixel count.

The present invention is not limited to the case that readout of the imaging element is controlled based on pixel shift but pixel shift can be controlled depending on readout of the imaging element. The image signals of fields, each having a different readout position, acquired from one frame of the imaging element may be obtained in such a manner that an optical image corresponding to each field is taken by the imaging element while shifting an exposure timing and then the image signal of one frame from the imaging element is collectively readout.

Furthermore, another embodiment of the imaging display device according to the present invention may be configured in such a manner that, for example, among the functions of the above-mentioned second to sixth embodiments, a desired function is selected by a user depending on display resolution and power consumption or a predetermined function is automatically selected depending on remaining battery charge. In this case, not only 4-point pixel shift but 2-point pixel shift of shifting two arbitrary pixels in 4-point pixel shift can be selectively done. The color imaging element is not limited to RGB Bayer array but a color imaging element having RGB delta array, RGB stripe array, RGB Emerald Green array and the like can be effectively applied to the present invention.

The invention claimed is:
1. An imaging display method comprising the steps of:
shifting a display position of a n image display unit by a shifting operation;
acquiring image signals of plurality of fields, having different readout positions, from an imaging element that photoelectrically converts optical image depending on the display position; and
controlling the display position by the shifting operation and a readout position of the imaging element, and displaying the image signals of the plurality of fields on the image display unit at a timing synchronized with the shifting operation;
wherein the imaging element has more pixels than the pixel count of the image display unit, and pixel counts of the image signals of the fields are converted to the pixel count of the image display unit and the converted image signals are displayed on the image display unit, and
wherein when the display position is in an initial position, an image signal of a select field is read out by sub-sampling pixels of the imaging element by a select interval; and
when a display element is in a position shifted to a select direction from the initial position, an image signal of another select field is read out by shifting a readout position of each pixel on the imaging element to the select direction and sub-sampling pixels of the imaging element by the select interval to acquire image signals of a plurality of fields.

2. An imaging display device comprising:
a pixel shift unit that optically shifts a display position of an image display unit by a shifting operation,
an imaging element that photoelectrically concerts optical image;
a readout control unit that acquires image signals of a plurality of fields, having different readout positions, from the imaging element, depending on the display positions;
a system control unit that controls the display position by the shifting operation and a readout position of the imaging element and displays the image signals on the image display unit at a timing synchronized with the shifting operation;
an image output unit for converting the image signals of the plurality of fields into image signals having a pixel count of the image display unit, wherein the imaging element has more pixels than the pixel count of the image display unit;
wherein when the display position is in an initial position, the readout control unit reads out an image signal of a select field by sub-sampling pixels of the imaging element by a select interval; and
when a display element is in a position shifted to a select direction from the initial position, the readout control unit reads out an image signal of another select field by shifting a readout position of each pixel on the imaging element to the select direction and sub-sampling pixels of the imaging element by the select interval in order for the readout control unit to acquire image signals of a plurality of fields.

* * * * *